Figures 1, 2, 3:
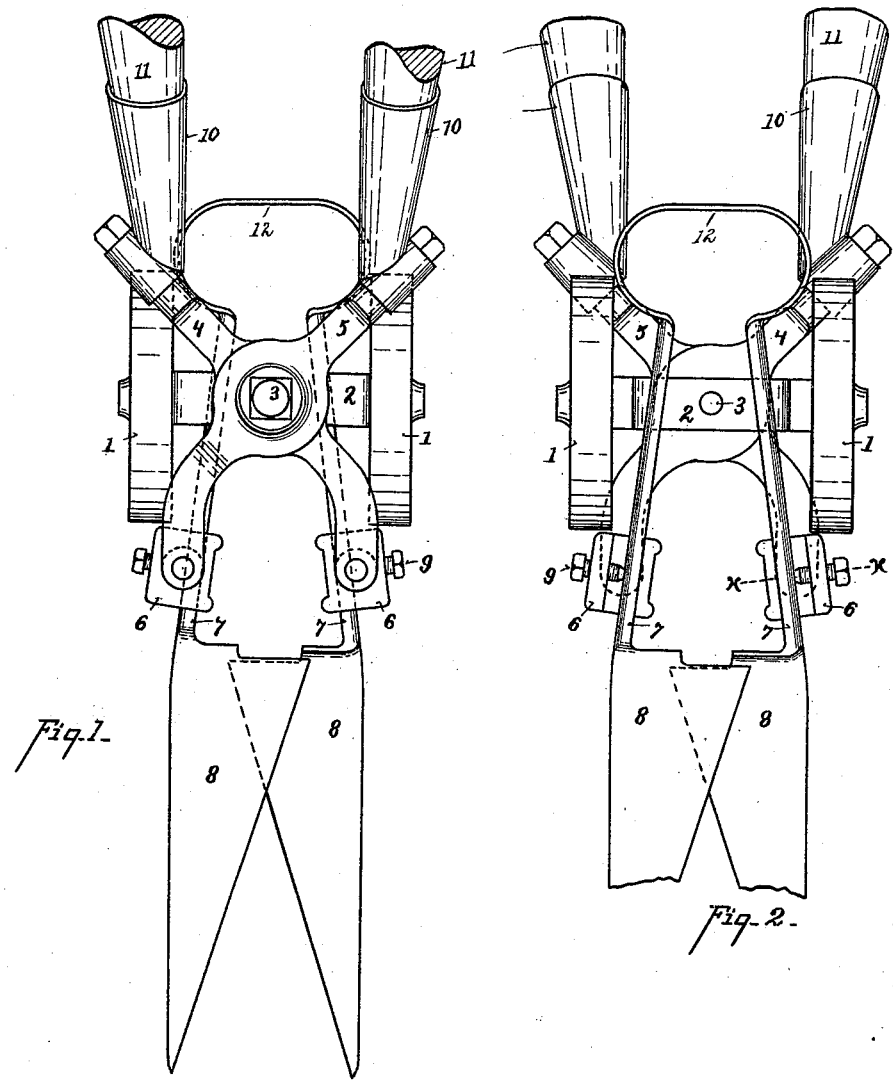

(No Model.)

E. W. McGUIRE.
LAWN CLIPPER.

No. 523,229. Patented July 17, 1894.

Attest
C. W. Miles
O. Kaiser

Inventor
Elwood W. McGuire
By Wood & Boyd
Atty's.

UNITED STATES PATENT OFFICE.

ELWOOD W. McGUIRE, OF RICHMOND, INDIANA.

LAWN-CLIPPER.

SPECIFICATION forming part of Letters Patent No. 523,229, dated July 17, 1894.

Application filed October 18, 1893. Serial No. 488,523. (No model.)

*To all whom it may concern:*

Be it known that I, ELWOOD W. MCGUIRE, a citizen of the United States, residing at Richmond, in the county of Wayne and State of Indiana, have invented certain new and useful Improvements in Lawn-Clippers, of which the following is a specification.

The object of my invention is to provide a new and improved tool adapted to clip the borders of lawns, and it is also adapted for trimming shrubbery, hedges, &c.

The various features of my invention are fully set forth in the description of the accompanying drawings making a part of this specification, in which—

Figure 1 is a top plan view of my improvement. Fig. 2 is a bottom plan view. Fig. 3 is a section on line $x, x$, Fig. 2.

1, 1, represent ground wheels.

2 represents an arch or crank axle. Upon the ends of the crank arms the wheels are journaled. 3 represents a stud projecting up from the crank axle on which journal the lever arms 4, 5; the forward ends of said crank arms are preferably pivoted to clamping blocks 6; said head blocks are provided with grooves in which engage shanks 7 of the shear blades 8.

9 represents a set screw rigidly clamping said shear shanks to the head blocks.

10 represents sockets secured to the rear end of crank arms 4 and 5.

11 represents handles inserted in the sockets by which the lever arms 4 and 5 are manipulated to open and close the shear blades 8.

In the preferred form of construction I prefer to connect the shanks by a bow-spring 12, like ordinary sheep shears; but I do not confine myself to this construction.

The handles are of convenient length so that a person may stand erect and propel the clipper forward and manipulate the handles to trim lawn edges, &c., without stooping.

It will be observed that very powerful leverage may be easily exerted on the shears, and hence large twigs, hedges, &c., can be readily trimmed, as well as borders and edges, and on difficult and uneven ground.

The shears may be readily detached and used by hand for horticultural purposes, so that one implement answers all purposes in trimming and ornamentation of lawns, but I do not desire to limit myself to the use of sheep shears or shears the shanks of which are united by a spring, as independent shear blades will operate fairly well.

Having described my invention, what I claim is—

1. The combination with a carriage, of lever-arms 4 and 5 pivotally mounted on the carriage and having suitable handles, the shears 8 having shanks 7, and clamps carried by the lever-arms for detachably connecting the shanks of the shears therewith, substantially as described.

2. In combination with the lever arms 4, 5, mounted upon a traveling carriage, the shears 8, the shank 7 engaging with the head blocks 6, and handles for manipulating the crank arms, substantially as specified.

3. A clipper carriage composed of the ground wheels 1, the arch axle 2, the lever arms 4 and 5 mounted thereon, means for manipulating said lever arms, and means for clamping shear blades to the forward end of said crank arms, substantially as specified.

In testimony whereof I have hereunto set my hand.

ELWOOD W. MCGUIRE.

Witnesses:
OTTO H. SPRONG,
HENRY C. STARR.